United States Patent Office 3,335,289
Patented Aug. 8, 1967

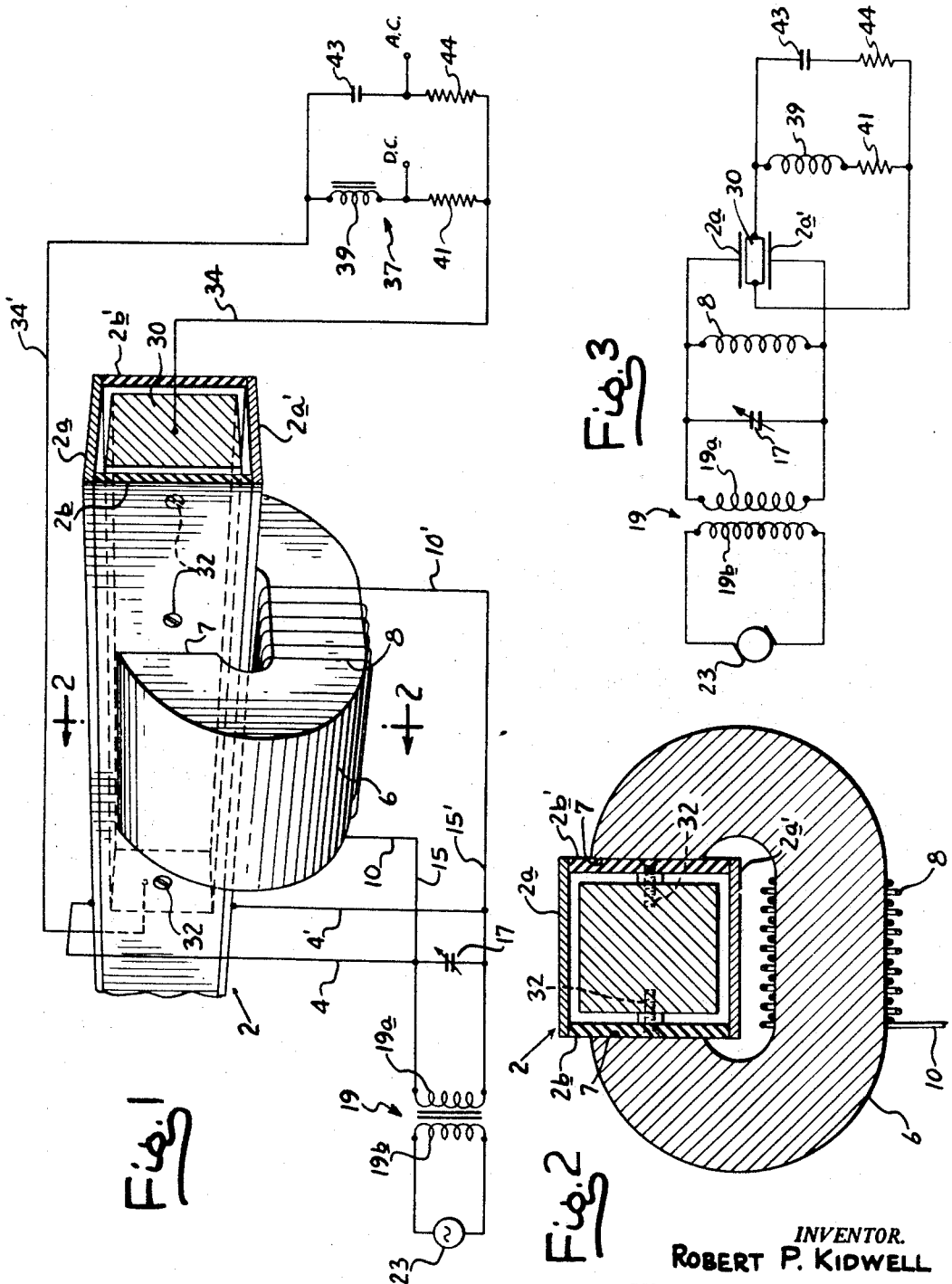

3,335,289
ELECTRICAL ENERGY CONVERSION DEVICE
Robert P. Kidwell, 2213 Calle de Suenos,
Las Cruces, N. Mex. 88001
Original application May 17, 1961, Ser. No. 110,777, now Patent No. 3,219,851, dated Nov. 23, 1965. Divided and this application Apr. 3, 1963, Ser. No. 270,228
5 Claims. (Cl. 307—72)

This application is a division of application Ser. No. 110,777, filed May 17, 1961 now U.S. Pat. No. 3,219,851.

The present invention relates to electrical devices for converting electrical energy at one frequency to direct current and/or current at other frequencies and for converting electrical to mechanical energy or mechanical to electrical energy.

The present invention deals with electromagnetic fields interacting with conductive mediums to provide efficient conversion of electrical energy at one frequency to alternating current of twice this frequency and/or to direct current. The main advantages of the invention lie in the high degree of flexibility, efficiency, simplicity, and ruggedness of the equipment constituting the present invention.

The various advantages broadly described above are accomplished in the present invention through the mutual interaction of orthogonally related alternating magnetic and electric fields operated at the same frequency and displaced in phase by approximately 90°, and a medium acted on by the fields. Although orthogonally related magnetic and electric fields have been heretofore used in various ways for various applications, none have been alternating fields phased and used in the manner to be described.

In the most preferred form of the present invention, a conduit is provided comprising a pair of opposed conductive walls forming a pair of electric field developing electrodes and joined by a pair of insulating walls. An alternating current electric field is developed between the conductive walls by applying a suitable alternating current voltage thereto at a given frequency. The magnetic field is generated within the conduit at right angles to the electric field by placing the conduit in an air gap of a C-shaped core of magnetic material forming the core of a transformer. In a preferred manner to be described, alternating current is fed to windings of the transformer to provide an alternating magnetic field which is displaced 90° in phase from the aforesaid electric field. A force is developed within both dielectric or conductive materials in the conduit.

The medium acted upon by the cross alternating electrical and magnetic fields of the present invention is a solid conductive body. It has been discovered that by anchoring such a conductive body to the walls of the aforesaid conduit in the region of the crossed electric and magnetic fields in a manner where the conductive body is insulated from the conductive walls of the conduit, useful electrical energy can be obtained by coupling an output circuit across the ends of the conductive body. The electrical energy comprises a direct current component and an alternating current component at twice the frequency of the alternating electric and magnetic fields. Both the direct current and alternating current energy components can be extracted from the output circuit by suitable filters.

Other advantages and features of the present invention will become apparent upon making reference to the specification to follow, the claims and the drawings wherein:

FIG. 1 is a device for converting an alternating current of a primary energizing voltage source to either direct current or alternating current at twice the frequency of the energizing voltage;

FIG. 2 is a transverse section of FIG. 1 taken along section line 2—2 therealong; and FIG. 3 is a simplified electrical diagram of the apparatus of FIG. 1.

Referring now and more particularly to FIGS. 1 and 2, the apparatus there shown includes a conduit generally indicated by reference numeral 2 having upper and lower conductive walls 2a–2a' made of metal or other suitable material and spaced insulating side walls 2b–2b' bridging the corresponding longitudinal marginal portions of the conductive walls 2a and 2a'. Conduit 2 forms a fluid-tight passageway. A pair of conductors 4–4' are respectfully connected to the conductive walls 2a and 2a' of the conduit.

The conduit 2 is placed in the air gap 7 of a C-shaped core 6 of magnetic material. The spaced confronting surfaces of the core 6 defining the margins of the air gap engage or are contiguous to the insulating side walls 2b–2b' of the conduit 2. Windings 8 are wound around the core and the ends of the windings are connected to conductors 10–10'.

Alternating voltages of proper phase appear on or are fed to the conductors 4–4' and 10–10' leading to the conductive walls 2a–2a' and windings 8 to produce orthogonally phased crossed electric and magnetic fields. Voltages are either externally or internally generated to produce an alternating electric field extending between the conductive walls 2a–2a" and an alternating magnetic field at right angles to the electric field. The phase of the magnetic field lags or leads the phase of the alternating electric field by about 90° so that the two fields are orthogonally related in both a physical as well as a time sense.

The conductive walls 2a and 2a', in effect, form the plates of a capacitor which are coupled by conductors 15–15' in parallel to the windings 8 which constitute an inductance coil. A tuning capacitor 17 is connected between the conductors 4 and 4' for tuning the parallel circuit to resonance.

The invention shown in FIGS. 1 and 2 is a system for converting alternating current to direct current and an alternating current at twice the frequency of the alternating current. The source of alternating current is a generator 23 coupled through the primary and secondary winding of a transformer 19 to the resonant circuit including the capacitor 17. The conductive medium in the conduit 2 is a conductive metal bar 30 which is fixedly mounted within the conduit by means of screws 32 passing through the insulating walls 2b and 2b'. The conductive body 30 is spaced from the conductive plates 2a and 2a' so as to be insulated therefrom. A pair of conductors 34–34' are soldered or otherwise electrically connected to the opposite ends of the conductive bar 30. These conductors extend to an output circuit generally indicated by reference numeral 37. The output circuit 37 shown comprises a first branch including an AC filter choke 39 in series with a load resistor 41. The other branch comprises a DC filter capacitor 43 in series with a load resistor 44.

The operation of the apparatus shown in FIGS. 1 and 2 is as follows: The generator 23 and the associated resonant circuitry provide crossed orthogonally phased and related electric and magnetic fields. Since the conductive body 30 is permanently anchored to the conduit, it does not use any of the generated energy. However, it can be shown that electrical signals are induced within the conductive bar 30 which have both direct current and double frequency signal components. These two components can be separated out by means of the output circuit 37. The filter choke 39 filters out the alternating current component from this branch circuit so that substantially pure direct current voltage appears across the load resistor 41. In the other branch circuit, the capacitor 43 filters out any direct current component from the load resistor 44 so that a double frequency signal component appears across the resistor 44. Obviously one or both of these branches may be utilized depending upon whether DC or AC or both of the signal components are desired.

It should be understood that numerous modifications may be made of the preferred forms of the invention described above without deviating from the broader aspects of the invention. What I claim as new and desire to protect by Letters Patent of the United States is:

1. Electrical converter apparatus comprising: a solid conductive body, a pair of conductive electrodes on opposite sides of said conductive body and insulated therefrom, means feeding an alternating voltage to said electrodes for providing an alternating electric field at a given frequency between said electrodes, means anchoring said conductive body against relative movement with respect to said electrodes, electromagnet means comprising a coil positioned to pass a magnetic field through said conductive body in the region of said electric field and at right angles thereto, means feeding an alternating current at a given frequency through said coil to provide a magnetic field in the region between said electrodes which has a phase displaced in time by 90° from the phase of the electric field extending at right angles thereto, and an output circuit coupled between the ends of said conductive body for withdrawing direct current and/or alternating current therefrom induced into said conductive body.

2. Electrical converter apparatus comprising: a solid conductive body, a pair of conductive electrodes on opposite sides of said conductive body and insulated therefrom, means feeding an alternating voltage to said electrodes for providing an alternating electric field at a given frequency between said electrodes, means anchoring said conductive body against relative movement with respect to said electrodes, electromagnet means comprising a coil positioned to pass a magnetic field through said conductive body in the region of said electric field and at right angles thereto, means feeding an alternating current at a given frequency through said coil to provide a magnetic field in the region between said electrodes which has a phase displaced in time by 90° from the phase of the electric field extending at right angles thereto, and an output circuit coupled between the ends of said conductive body, said output circuit comprising an alternating current extracting branch for extracting a voltage at twice said frequency and having direct current filtering means in series with a load impedance.

3. Electrical converter apparatus comprising: a solid conductive body, a pair of conductive electrodes on opposite sides of said conductive body and insulated therefrom, means feeding an alternating voltage to said electrodes for providing an alternating electric field at a given frequency between said electrodes, means anchoring said conductive body against relative movement with respect to said electrodes, electromagnet means comprising a coil positioned to pass a magnetic field through said conductive body in the region of said electric field and at right angles thereto, means feeding an alternating current at a given frequency through said coil to provide a magnetic field in the region between said electrodes which has a phase displaced in time by 90° from the phase of the electric field extending at right angles thereto, and an output circuit coupled between the ends of said conductive body, said output circuit comprising a direct current extracting branch having an alternating current filtering means in series with an output load impedance.

4. Electric converter appartus comprising: a solid conductive body, a pair of conductive electrodes on opposite sides of said conductive body and insulated therefrom, means anchoring said conductive body against relative movement with respect to said electrodes, electromagnet means comprising a coil positioned to pass a magnetic field through said conductive body at right angles to a line extending between said electrodes, means connecting said electrodes and said coil in parallel circuit relation where they form part of a parallel resonant circuit, tuning means for adjusting the resonant frequency of said parallel resonant circuit, a source of alternating current at a frequency to which the parallel resonant circuit is to be tuned, said source being connected to said parallel resonant circuit, and a circuit coupled between the ends of said conductive body.

5. Electric converter apparatus comprising: a solid conductive body, a pair of conductive electrodes on opposite sides of said conductive body and insulated therefrom, means anchoring said conductive body against relative movement with respect to said electrodes, electromagnet means comprising a coil positioned to pass a magnetic field through said conductive body at right angles to a line extending between said electrodes, means connecting said electrodes and said coil in parallel circuit relation where they form part of a parallel resonant circuit, tuning means for adjusting the resonant frequency of said parallel resonant circuit, a source of alternating current at a frequency to which the parallel resonant circuit is to be tuned, said source being connected to said parallel resonant circuit, and an output circuit coupled between the ends of said conductive body for coupling an induced signal from the ends of said conductive body.

No references cited.

MILLTON O. HIRSHFIELD, *Primary Examiner.*

G. GOLDBERG, D. X. SLINEY, *Assistant Examiners.*